US010601613B2

(12) United States Patent
Chatterjee et al.

(10) Patent No.: US 10,601,613 B2
(45) Date of Patent: Mar. 24, 2020

(54) METHODS AND APPARATUSES FOR CHANNEL ESTIMATION FOR NB-PBCH IN NB-LTE SYSTEMS

(71) Applicant: Intel IP Corporation, Santa Clara, CA (US)

(72) Inventors: Debdeep Chatterjee, San Jose, CA (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/749,307

(22) PCT Filed: Dec. 21, 2015

(86) PCT No.: PCT/US2015/067094
§ 371 (c)(1),
(2) Date: Jan. 31, 2018

(87) PCT Pub. No.: WO2017/039739
PCT Pub. Date: Mar. 9, 2017

(65) Prior Publication Data
US 2018/0227148 A1    Aug. 9, 2018

Related U.S. Application Data

(60) Provisional application No. 62/213,568, filed on Sep. 2, 2015.

(51) Int. Cl.
*H04L 25/02* (2006.01)
*H04L 5/00* (2006.01)

(52) U.S. Cl.
CPC ......... *H04L 25/0226* (2013.01); *H04L 5/005* (2013.01); *H04L 25/022* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 9,241,287 B2 * | 1/2016 | Montojo | H04W 36/0061 |
| 2013/0044678 A1 * | 2/2013 | Qu | H04W 52/244 370/328 |
| 2013/0083749 A1 * | 4/2013 | Xu | H04W 74/0833 370/329 |
| 2014/0192733 A1 * | 7/2014 | Charbit | H04L 5/0053 370/329 |

(Continued)

OTHER PUBLICATIONS

International Search Report and Written Opinion dated Jun. 7, 2016 from International Application No. PCT/US2015/067094, 21 pages.

(Continued)

*Primary Examiner* — Alex Skripnikov
(74) *Attorney, Agent, or Firm* — Fish & Richardson P.C.

(57) ABSTRACT

Embodiments of the present disclosure describe systems, devices, and methods for channel estimation for NB-PBCH in NB-LTE systems. Various embodiments may relate to options that can be used for demodulation of the NB-PBCH by the NB-LTE-UEs, and in certain embodiments may include a reference signal (RS) usable for demodulation of the NB-PBCH by the NB-LTE-UEs. Other embodiments may be described or claimed.

13 Claims, 10 Drawing Sheets

(56) References Cited

U.S. PATENT DOCUMENTS

| | | | |
|---|---|---|---|
| 2014/0341175 A1* | 11/2014 | Beale | H04L 5/0007 370/330 |
| 2015/0016239 A1 | 1/2015 | Yi et al. | |
| 2015/0333880 A1* | 11/2015 | Yi | H04L 5/001 370/329 |
| 2016/0105862 A1* | 4/2016 | Charbit | H04W 4/70 370/336 |
| 2016/0338091 A1* | 11/2016 | Martin | H04L 5/003 |
| 2017/0164350 A1* | 6/2017 | Sun | H04L 5/0007 |
| 2017/0207938 A1* | 7/2017 | Niemela | H04L 25/03834 |

OTHER PUBLICATIONS

Fechtel et al., "Optimal Linear Interpolative Channel Estimation for TDMA-Based Personal Mobile Communications over Frequency-Selective Channels," Aachen University of Technology, Vehicular Technology Conference, 1995 IEEE 45th Chicago, IL, USA Jul. 25-28, 1995, New York, NY, USA, vol. 1, Jul. 25, 1995 (Jul. 25, 1995), pp. 321-325.

Arslan et al., "Interpolation and Channel Tracking Based Receivers for Coherent Mary—PSK Modulations," Ericsson Inc., Vehicular Technology Conference, 1999 IEEE 49th Houston, TX, USA, May 1999, Piscataway, NJ, USA, IEEE, US, vol. 3, May 16, 19999 (May 16, 19999), pp. 2194-2199.

\* cited by examiner

301 — Identify a location of a synchronization signal including at least one of Narrowband Primary or Secondary Synchronization Signal (NB-PSS or NB-SSS), the identified location corresponding to a first subframe adjacent to a second subframe carrying the NB-PBCH 302 — Insert channel estimates into the identified location 303 — Transmit the synchronization signal having the channel estimates inserted into the identified location to enable recovery of a narrowband Physical Broadcast Channel (NB-PBCH) at a User Equipment (UE)

FIG. 3

METHODS AND APPARATUSES FOR CHANNEL ESTIMATION FOR NB-PBCH IN NB-LTE SYSTEMS

CROSS-REFERENCE TO RELATED APPLICATIONS

The present application is a national phase entry under 35 U.S.C. § 371 of International Application No. PCT/US2015/067094, filed Dec. 21, 2015, entitled "METHODS AND APPARATUSES FOR CHANNEL ESTIMATION FOR NB-PBCH IN NB-LTE SYSTEMS", which designates the United States of America, which claims the benefit of priority under 35 U.S.C. § 119(e) of U.S. Provisional Application No. 62/213,568, filed Sep. 2, 2015, entitled "CHANNEL ESTIMATION FOR NB-PBCH IN NB-LTE SYSTEMS." The entire specifications of which are hereby incorporated by reference in their entireties for all purposes, except for those sections, if any, that are inconsistent with this specification.

FIELD

Embodiments of the present disclosure generally relate to the field of wireless communication, and more particularly, to methods and apparatuses for machine-type communications in cellular networks.

BACKGROUND

Machine-type communication (MTC) is a promising and emerging technology to enable a ubiquitous computing environment towards the concept of "Internet of Things (IoT)." Potential MTC-based applications include smart metering, healthcare monitoring, remote security surveillance, intelligent transportation systems, etc. Existing mobile broadband networks were designed to optimize performance mainly for human types of communications and thus are not designed or optimized to address the MTC-related issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates operations that may performed by the circuitry of the eNB of FIG. 1 in accordance with various embodiments.

DETAILED DESCRIPTION

Figure 1:
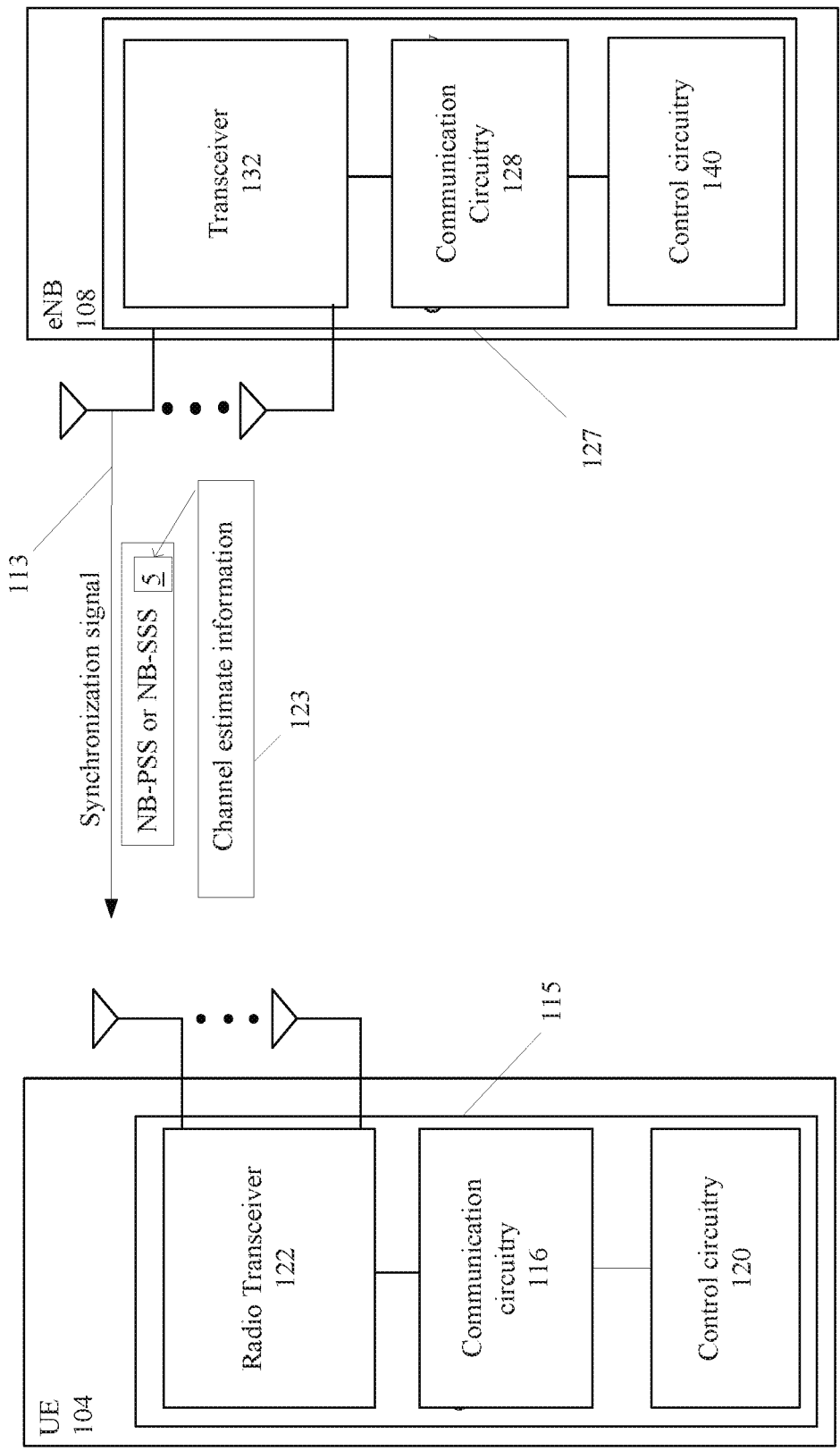
FIG. 1 illustrates a system for channel estimation for NB-PBCH demodulation using NB-PSS in accordance with various embodiments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrases "A or B," "A/B," and "A and/or B" mean (A), (B), or (A and B).

As used herein, the term "circuitry" refers to, is part of, or includes hardware components such as an application specific integrated circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. In some embodiments, the circuitry may be implemented in, or functions associated with the circuitry may be implemented by, one or more software or firmware modules. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. In some embodiments, circuitry may include logic, at least partially operable in hardware, to perform the described operations.

Illustrative embodiments of the present disclosure include, but are not limited to, methods, systems, computer-readable media, and apparatuses that may enable MTC services and applications and support the design and development of a new type of MTC device that can be seamlessly integrated into current and next generation mobile broadband networks such as Long Term Evolution (LTE) and LTE-Advanced networks. As used herein, a reference to LTE may include LTE or LTE-A unless otherwise indicated.

Optimized support of a massive number of Cellular Internet of Things (CIoT) or Machine-Type Communication (MTC) devices that have very low device complexity, are latency-tolerant, and require low throughput and very low power consumption, is seen as a key ingredient for next-generation cellular wireless networks. Such designs of CIoT systems can be based on an evolution of the 3GPP LTE-Advanced features like Rel-13 support of low complexity MTC devices (termed as Category M devices) that need to support a bandwidth of 1.4 MHz on the DL (downlink) and UL (uplink) at both RF and baseband irrespective of the system BW.

To reduce the cost and power consumption of MTC operation, it may be beneficial to reduce the system bandwidth to, for example, 200 KHz, which corresponds to roughly a single physical resource block (PRB) in existing LTE design. This "cellular IoT" could potentially operate in re-farmed global system for mobile communications (GSM) spectrum, within the guard bands of an LTE carrier, or within a dedicated spectrum. Specifically, CIoT devices can be supported on NarrowBand (NB)-LTE systems and these devices may only need to support up to 200 kHz bandwidth for both DL and UL or only for the UL at both RF and baseband stages (such LB-LTE systems (that support CIoT devices) may be referred to as NB-IoT systems). Such an NB-LTE system, e.g., NB-IOT system, with 180 kHz or 200 kHz bandwidth can be deployed on GSM bands or on LTE guard bands or within larger LTE system bandwidths (occupying 1 LTE Physical Resource Block (PRB)). Following the LTE design, such NB-LTE systems can use an OFDMA-based multiple access mechanism (orthogonal frequency-division multiple access) in the DL and an SC-FDMA (or DFT-S-OFDMA)-based design in the UL (single-carrier FDMA and DFT-spread-ODMA (discrete Fourier transform), respectively).

Alternatively, such NB systems for CIoT devices can be designed as a new Radio Access Technology (RAT), e.g., following a Clean Slate approach to support CIoT devices, on 200 kHz-wide GSM bands or in the LTE guard bands.

In legacy LTE systems, the cell-specific reference signals (CRS) are typically used for demodulation of the Physical Broadcast Channel (PBCH) carrying the Master Information Block (MIB). For NB-LTE systems with in-band deployments, NB-LTE system can be deployed using one or more PRBs from a larger LTE system bandwidth (BW). Without loss of generality, in this work we consider such a system with a single PRB with NB-LTE within the LTE system BW. The location of the PRB relative to the DL system BW may not be known to the CIoT device (referred to at times as the "NB-LTE-UE" or simply "UE" in this work). Therefore, the legacy CRS may not be used by the NB-LTE-UE to demodulate the Narrowband PBCH (NB-PBCH) since the CRS sequence for legacy LTE is designed as a function of the PRB index with respect to 20 MHz system BW.

Embodiments herein may be related to 3GPP RANI WG/5G MTC. Embodiments herein may relate to options that can be used for demodulation of the NB-PBCH by the NB-LTE-UEs, and in certain embodiments may include a reference signal (RS) usable for demodulation of the NB-PBCH by the NB-LTE-UEs.

In one embodiment, an apparatus of a User Equipment (UE) to identify channel estimates of a synchronization signal including at least one of a Narrowband Primary or Secondary Synchronization Signal (NB-PSS or NB-SSS) to recover a Narrowband Physical Broadcast Channel (NB-PBCH) is provided. The apparatus may include radio frequency (RF) circuitry to receive the synchronization signal including at least one of the NB-PSS NB-SSS. The apparatus may include baseband circuitry to identify the channel estimates corresponding to a first subframe of the synchronization signal adjacent to a second subframe carrying the NB-PBCH. A location of the first subframe within a set of consecutive subframes may be cell-specific. The synchronization signal may be generated and transmitted by an eNB (evolved Node B).

In another embodiment, an apparatus of a User Equipment (UE) to identify channel estimates from a new reference signal (referred to herein as NB-RS) to recover a Narrowband Physical Broadcast Channel (NB-PBCH) is provided. The apparatus may include radio frequency (RF) circuitry to receive a first synchronization signal including at least one of a narrowband Synchronization Signal (NB-PSS) or a narrowband Secondary Synchronization Signal (NB-SSS), and to receive a second reference signal that is different than an LTE (long term evolution) Cell-specific Reference Signal (CRS). The second reference signal may be different than the first synchronization signal. The apparatus may include baseband circuitry to identify the channel estimates using the second reference signal, and to demodulate the narrowband NB-PBCH based on the identified channel estimates. The new reference signal may be generated an transmitted by an eNB.

FIG. 1 illustrates a system for channel estimation for NB-PBCH demodulation using NB-PSS in accordance with various embodiments.

The eNB 108 may be an access node of a 3rd Generation Partnership Project (3GPP) LTE network. In particular, the eNB 108 may be part of a radio access network (RAN) of the LTE network, such as an evolved universal terrestrial radio access network (E-UTRAN). While embodiments of the present disclosure are described with respect to LTE networks, similar concepts may also be applicable to other networks, for example, universal mobile telecommunications system (UMTS) networks, GSM networks, etc.

The E-UTRAN may be coupled with components of a core network, for example, an Evolved Packet Core (EPC) that performs various management and control functions of the LTE network and further provides a communication interface between various RANs and other networks.

The UE 104 may be any type of computing device equipped with wireless communication circuitry and adapted to communicate through a RAN according to, for example, one or more 3GPP Technical Specifications. The UE 104 may include, but is not limited to, a phone, a computer, a sensor, or any other device that is configured for wireless communication through a RAN. In various embodiments, the UE 104 may be a UE primarily designed for MTC and may also be referred to as an MTC UE.

The UE 104 may include circuitry 115 including communication circuitry 116, control circuitry 120, and radio transceiver 122.

Communication circuitry 116 may interface with the radio transceiver 122 to receive radio frequency (RF) signals from and/or send RF signals to one or more components, for example, eNB 108, over an air interface via the one or more antennas of the UE 104. The air interface between the UE 104 and the eNB 108 may be referred to as a Uu interface in 3GPP Technical Specifications. In various embodiments, the communication circuitry 116 may use evolved universal terrestrial radio access (E-UTRA) protocols for communications over the air interface. The communication circuitry 116 may use orthogonal frequency division multiple access (OFDMA) for downlink communications and single carrier-frequency division multiple access (SC-FDMA) for uplink communications on the Uu interface.

The communication circuitry 116 may include signal-construction circuitry including, but not limited to, an encoder to encode input data, and a modulator to modulate a carrier signal to include the encoded input data to be transmitted. The communication circuitry 116 may further include signal-deconstruction circuitry including, but not limited to, a demodulator to provide encoded data from a modulated carrier signal, and a decoder to provide data from encoded data.

The radio transceiver 122 may provide for the transmission and reception of the RF signals. The radio transceiver 122 may have RF transmit circuitry such as, but not limited to, an up-converter to convert baseband signals to radio-frequency signals, and a power amplifier (PA) to amplify the RF signals for transmission. The radio transceiver 122 may further have RF receive circuitry such as, but not limited to, a low-noise amplifier to amplify a received RF signal, a filter to filter a received RF signal, and a downconverter to convert an RF signal to a baseband signal.

The control circuitry 120 may be coupled to communication circuitry 116, and may be configured to perform higher layer operations, for example, operations at layers in a communication protocol stack that are higher than layers of the communication protocol stack that perform the operations of the communication circuitry 116 for the radio transceiver 122.

In some embodiments, the communication circuitry 116 and the control circuitry 120 may, collectively, provide the majority or all of the operations related to the communication protocol stack. The communication circuitry 116 and the control circuitry 120 may include, or be a part of, baseband circuitry (for example, a baseband chipset), a PC card, a connect card, a mobile broadband modem, etc.

The eNB 108 may include circuitry 127 including communication circuitry 128 to interface with transceiver 132 to communicate over the air interface to, for example, receive uplink RF signals from UE 104 via one or more antennas of the eNB 108 and transmit downlink RF signals to UE 104 via the one or more antennas. In some embodiments, the communication circuitry 128 may have signal-construction circuitry and signal-deconstruction circuitry that complement the corresponding circuitry in communication circuitry 116. Similarly, the transceiver 132 may include RF transmit circuitry and RF receive circuitry that complement the corresponding circuitry in radio transceiver 122.

The eNB 108 may also include control circuitry 140 coupled with communication circuitry 128. The control circuitry 140 may be configured to perform higher layer operations to control aspects of wireless communications in the cell provided by the eNB 108.

In addition to communication over the air interface, the components of the UE 104 and eNB 108 may include circuitry to communicate over one or more additional wired or wireless interfaces. For example, in some embodiments, the transceiver 132 may include an Ethernet interface to support S1-AP signaling over Ethernet networks such as, but not limited to, fiber-optic gigabit and 10 Gigabit Ethernet, to provide the S1-MME interface.

For coherent demodulation of NB-PBCH the UE 104 first may estimate the channel. However, as mentioned previously, in some cases channel estimate cannot be done using the legacy CRS for NB-LTE deployments within larger LTE system BW since the relative location of the PRB used for NB-LTE may not be known by the UE 104 before reading the MIB. This may be due to the fact that according to LTE specifications, the sequence used for CRS generation is mapped according to the PRB location relative to the maximal LTE system BW, $N_{RB}^{max,DL}=110$ PRBs.

One option can be to use PSS/SSS of the NB-LTE system (referred to as NB-PSS/SSS) to obtain the channel estimates that may be used for NB-PBCH demodulation. In an example, the circuitry 127 may be configured to include data, e.g. channel estimation information 123, in a location 5 of the synchronization signal 113, e.g., NB-PSS/SSS. While it may be possible to explicitly signal the location 5, in an example the circuitry 127 may determine the location according to a protocol known to the circuitry 115. The circuitry 115 may in turn use the protocol to determine the location 5 of the synchronization signal 113. The circuitry 115 may use the data to estimate the channel, and recover the NB-PBCH based on the channel estimate.

The NB-PBCH subframes can be located on subframes adjacent to the NB-PSS/SSS subframes respectively. However, the quality of channel estimates may not be acceptable if NB-PSS is designed based on a single root sequence or for the case of synchronized networks due to neighbor cell interference, e.g., the channel estimates obtained from NB-PSS would correspond to the "composite channel" from multiple cells and not the channel from the cell of interest.

To address this, in one embodiment, the NB-PSS location, e.g., the subframe used to carry the NB-PSS within an LTE system frame (spanning 10 ms) or, more generally, within a set of consecutive subframes, e.g., N consecutive subframes, may be different for different cells in the network. As a specific example, the NB-PSS location within the LTE frame may be defined as a function of the Physical Cell Identity (PCID) of the cell such that the subframe location is given by SF #n where n=mod(3*mod(PCID, 3)+9, 10) assuming all subframes may be used for transmission of NB-PSS and NB-PBCH. This may be possible for the case of standalone NB-LTE deployments that are not in-band within a larger LTE system BW.

In another embodiment, considering in-band deployments wherein NB-PSS/SSS and NB-PBCH are not mapped to MBSFN subframes, the subframe location for NB-PSS may be given by n=n_cand(i) where i=mod(PCID, 2) and in one example, n_cand={4, 9}. If NB-PBCH is transmitted in the subframe right after the NB-PSS/SSS, the location for NB-PBCH may then be SFs #5 and #0 (in the next frame if the frame duration is 10 ms), respectively.

In yet another embodiment, the location of the NB-PSS may be different, e.g., based on the two options described above, for stand-alone and in-band deployments respectively. Such a mapping rule may enable to implicitly indicate to the UE 104, upon detection of NB-PSS and NB-SSS to acquire symbol, subframe, and frame time, as to whether the NB-LTE deployment is of stand-alone or in-band type.

Note that for all cases, the same NB-PSS location, e.g., subframe index in one frame may be maintained for all repetitions of the NB-PSS transmissions so that the UE 104 may combine the repetitions across multiple sets subframes (e.g., across multiple LTE system frames) for NB-PSS detection.

Figure 2:
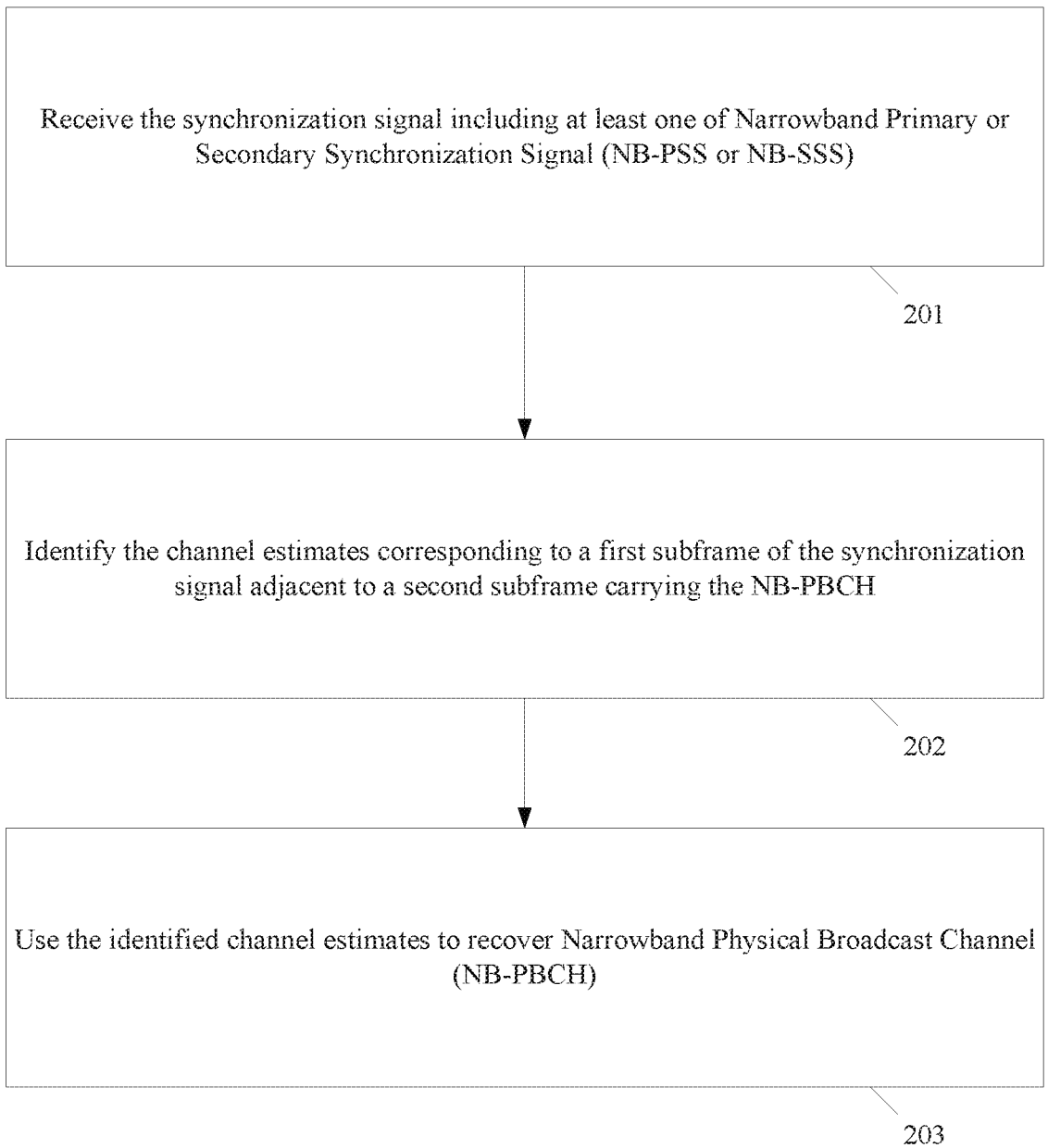
FIG. 2 illustrates operations that may performed by the circuitry of the CIoT device of FIG. 1 in accordance with various embodiments.

FIG. 2 illustrates operations that may performed by the circuitry 115 of the CIoT device of FIG. 1 in accordance with various embodiments. The operations described in FIG. 1 may be performed by the UE 104 in accordance with some embodiments. The operations described in the flowchart may be performed by various components of the UE 104 such as, but not limited to, communication circuitry 116 or control circuitry 120 of circuitry 115.

In block 201, the circuitry 115 may receive the synchronization signal including at least one of NB-PSS or NB-SSS, e.g., the UE may acquire time and frequency synchronization with the eNB based on at least one of NB-PSS or NB-SSS.

In block 202, the circuitry 115 may identify the channel estimates corresponding to a first subframe of the synchronization signal adjacent to a second subframe carrying the NB-PBCH. A location of the first subframe within a set of consecutive subframes may be cell-specific. In an example, the UE may use frame timing to determine physical resources and time locations, e.g. subframes carrying the NB-PBCH that are cell-specific. The NB-PBCH subframe(s) may be located adjacent to the NB-PSS/NB-SSS. The NB-PSS subframe location within a set of N consecutive LTE subframes may be cell-specific.

In block 203, the circuitry 115 may use the identified channel estimates to recover NB-PBCH, e.g., the UE may receive NB-PBCH by performing demodulation based on the identified channel estimates.

FIG. 3 illustrates operations that may performed by the circuitry 127 of the eNB of FIG. 1 in accordance with various embodiments. The operations described in FIG. 2 may be performed by the UE 104 in accordance with some embodiments. The operations described in the flowchart may be performed by various components of the eNB 108 such as, but not limited to, communication circuitry 128 or control circuitry 140 of circuitry 127.

In block 301, the circuitry 127 may identify a location of a synchronization signal including at least one of Narrowband Primary or Secondary Synchronization Signal (NB-PSS or NB-SSS), the identified location corresponding to a first subframe adjacent to a second subframe carrying the NB-PBCH. The identified location within a set of consecutive subframes may cell-specific.

In block 302, the circuitry 127 may insert channel estimates into the identified location.

In block 303, the circuitry 127 may transmit the synchronization signal having the channel estimates inserted into the identified location to enable recovery of a narrowband Physical Broadcast Channel (NB-PBCH) at a User Equipment (UE).

Figure 4:
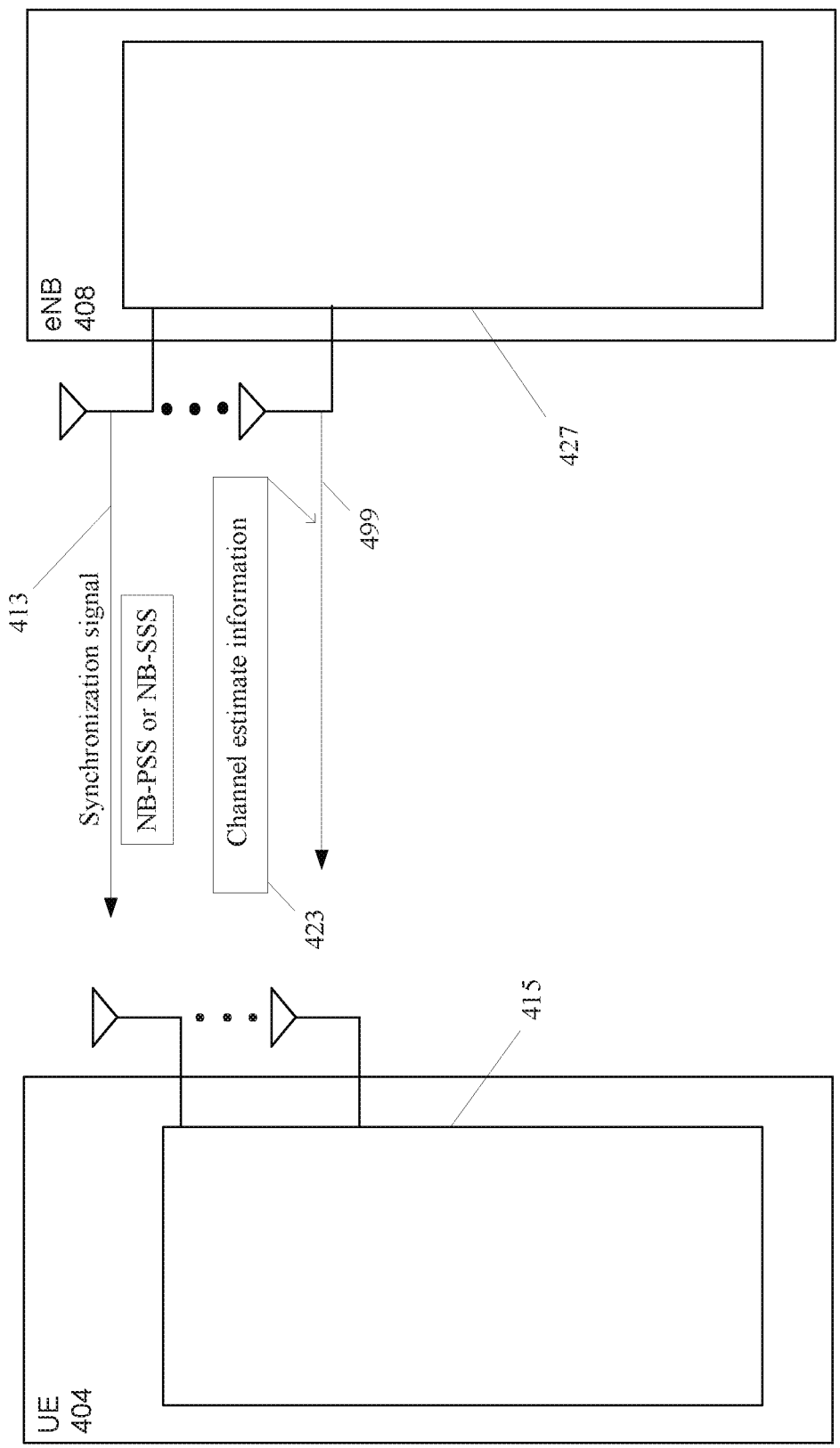
FIG. 4 illustrates a system for channel estimation for NB-PBCH demodulation using NB-RS.

FIG. 4 illustrates a system for channel estimation for NB-PBCH demodulation using NB-RS.

The system 400 includes an UE 404 and an eNB 408, which may include components similar to the UE 104 and the eNB 108, including one or more antennae, control circuitry (not illustrated) similar to the previously described control circuitry 120/128 (respectively), communication circuitry (not illustrated) similar to the previously described communication circuitry 120/140 (respectively), radio transceivers (not illustrated) similar to the previously described radio transceivers 122/132 (respectively).

Circuitry 427 of the eNB 408 may be configured to generate a reference signal (NB-RS) 499 to carry data, e.g., the channel estimate information. In such a case, the synchronization signal 413 may be similar to known synchronization signals, e.g., known NB-PSS or NB-SSS, in some embodiments. The circuitry 415 of the UE 404 may use the data of the reference signal 499 to estimate the channel, and recover the NB-PBCH based on the channel estimate.

In an embodiment, NB-RS 499 may be present at least in subframes carrying NB-PBCH on or different from the OFDM symbols carrying legacy CRS. The NB-PBCH data REs can be mapped to symbols within the subframe that avoid:

the first three or four OFDM symbols (corresponding to legacy LTE DL control channels like PDCCH, PCFICH, and PHICH), and legacy CRS REs.

Note that two options may be considered for the resource mapping of NB-PBCH depending on whether or not NB-PBCH can be transmitted on the OFDM symbols with legacy CRS.

In an embodiment, NB-RS may be present in subframes carrying Narrowband Physical Downlink Shared Channel (NB-PDSCH). In an example, NB-RS may be present in subframes carrying NB-PDSCH on or different from the OFDM symbols carrying legacy CRS.

Implementation A of Channel Estimation for NB-PBCH Recovery Using NB-RS

In one embodiment, NB-PBCH may be transmitted on the OFDM symbols with legacy CRS. In this case, the detailed design on NB-RS may be described as follows below.

Within the CRS symbols other than the first three OFDM symbols in an LTE subframe, the NB-RS may be mapped onto one or more REs not occupying the CRS. Moreover, the NB-RS may use the resource and antenna port (AP) mapping similar to CRS design for one, two, or four AP transmissions and the sequence used for NB-RS may reuse the CRS sequence corresponding to that for PRB index 0 in legacy LTE systems. As one example, NB-RS may be mapped to subcarriers k within a PRB similar to CRS with an additional shift of 1 or 2 subcarriers, e.g.:

$$k=6m+(v+v_{shift}+x) \bmod 6$$

where m=0 and 1, x=1 or 2, and v defined as in legacy LTE specifications [TS 36.211]:

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}.$$

Figure 7:
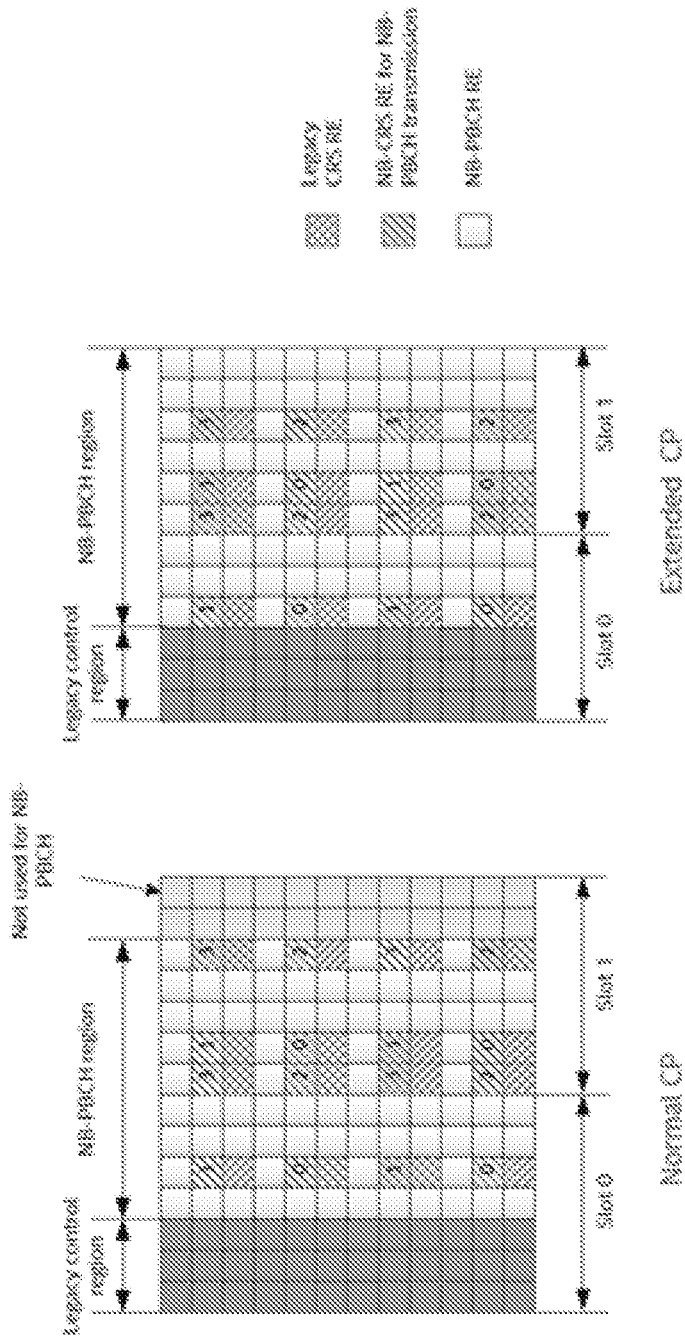
FIGS. 7-9 illustrate a resource mapping scheme that may be utilized by the systems of FIGS. 1 and 4.

FIG. 7 illustrates one example of resource mapping scheme for NB-PBCH transmission in the normal and extended CP. In FIG. 7, NB-CRS is located in the REs which are adjacent to the legacy CRS REs (with additional shift of 1 subcarriers, e.g., x=1 as mentioned above). Further, the NB-PBCH data symbols are rate-matched around or punctured by both legacy CRS REs and NB-CRS REs. According to this structure, CIoT devices may be configured to perform channel estimation on the NB-CRS REs and attempt to decode the NB-PBCH.

FIG. 7 also shows one example of the NB-RS resource mapping on the antenna port p, where p=0,1,2,3. Note that in FIG. 7, 0 indicates the antenna port 0, while 1 indicates the antenna port 1, etc. The mapping of REs for NB-RS to APs may either be same as legacy CRS or swapped between APs 0 and 1, and between APs 2 and 3 in frequency dimension and between APs 0 and 2, and between APs 1 and 3 in time dimension, and equal number of REs allocated for each AP as shown in FIG. 7. Other resource mapping examples may be straightforwardly extended from this example. For example, NB-PBCH may also be mapped on the last two OFDM symbols in the case of normal CP.

Implementation B of Channel Estimation for NB-PBCH Recovery Using NB-RS

In another embodiment, NB-PBCH may not be transmitted on the OFDM symbols with legacy CRS. In this case, the previous embodiments described for NB-RS may be applied with the exception of not using the remaining REs in the OFDM symbols with CRS and NB-RS transmissions for NB-PBCH.

Figure 8:
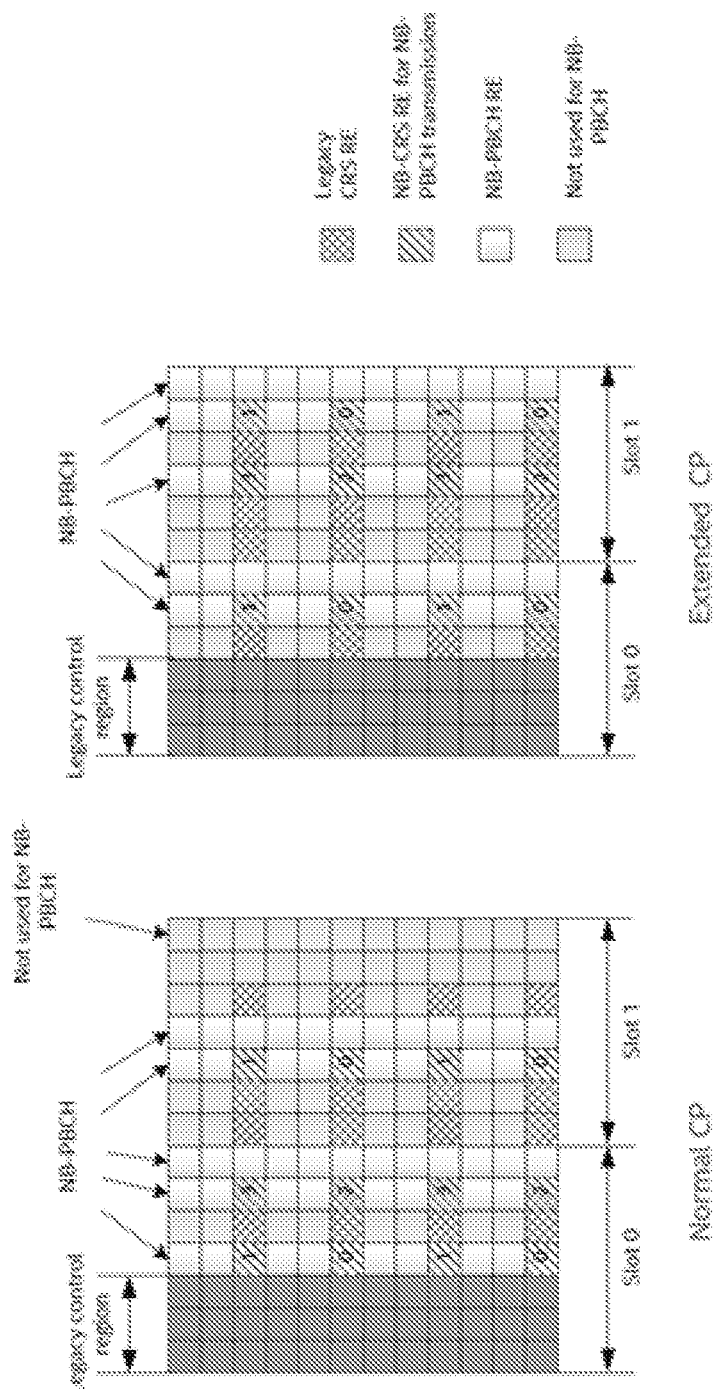

In another embodiment of implementation B, with no NB-PBCH transmissions on legacy CRS symbols, the NB-RS may be transmitted on symbols next to the legacy CRS symbols. FIG. 8 illustrates one such example of the resource mapping scheme for the transmission of NB-PBCH for normal and extended CP respectively. In the example, NB-PBCH is transmitted in the OFDM symbol #3, 5 and 6 in the first slot and #3, 4 in the second slot in the normal CP case.

In one example, the same frequency shift for the transmission of legacy CRS may be applied for the transmission of NB-RS. In particular, NB-RS may be mapped to the subcarrier k with k=6m(v+$v_{shift}$)mod 6 as defined above.

Figure 9:
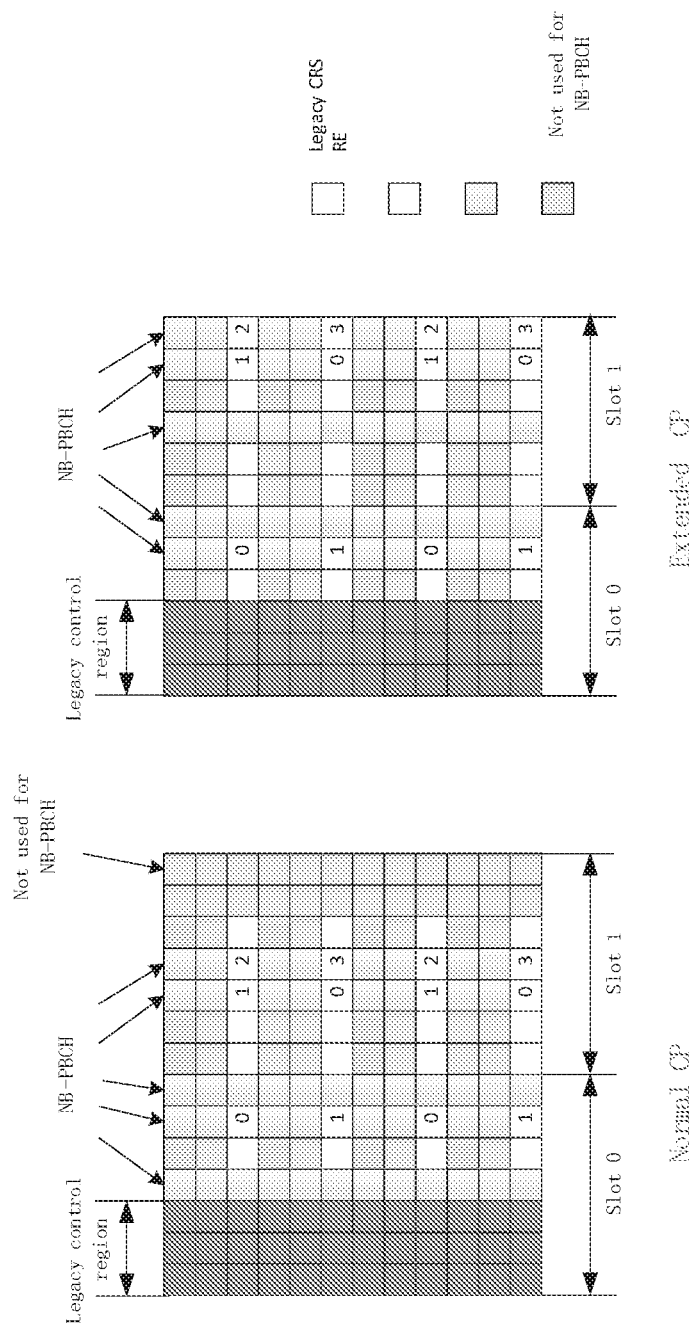

FIG. 8 shows one example of the NB-RS resource mapping on the antenna port p, where p=0,1,2,3. Note that in FIG. 8, 0 indicates the antenna port 0, while 1 indicates the antenna port 1, etc. Other resource mapping examples may be straightforwardly extended from this example. For example, NB-PBCH may also be mapped on the last two OFDM symbols in the case of normal CP. An alternative AP to RE mapping for implementation B and following AP to RE mapping pattern similar to that for legacy CRS is shown in FIG. 9.

The NB-RS may be transmitted with application of power boosting independent of the legacy CRS.

Note that the above design may lead to inter-cell collisions between legacy CRS and NB-CRS and hence, to minimize the impact to legacy UEs, in one embodiment, the NB-RS may be mapped to CRS symbols in the second slot only at the cost of slight degradation to channel estimation performance for NB-PBCH decoding based on NB-RS. Considering longer channel coherence time for CIoT applications with limited mobility, restricting the NB-RS only to the second slot of the subframe may not lead to significant channel estimation performance degradation.

In yet another embodiment, the NB-RS may be mapped to all CRS symbols except those within the first three symbols but only using m=0 or m=1 but not both values of m within a PRB in the above equation for determining the frequency location, e.g., the value of k within a PRB.

In another example, the NB-RS APs are limited to APs 0 and 1 only to support up to 2 Tx transmission of NB-PBCH. In this case, the NB-RS REs mapped to APs 2 and 3 may be re-used for APs 0 and 1 respectively or may be used to map NB-PBCH data REs.

The new NB-RS may also be used for other purposes in addition to demodulation of NB-PBCH—for instance, to perform Radio Resource Management (RRM) measurements including RSRP/RSRQ measurements together with measurements using LTE CRS. Additionally, in case multiple PRBs are available for the NB-LTE system, the NB-RS sequence and frequency domain subcarrier locations within a PRB may be mapped similar to LTE CRS using values of 'm' in the equation $$k=6m+(v+v_{shift}+x) \bmod 6$$

with x=0, 1, or 2, that are indexed over the set of available PRBs, starting with m=0 for the PRB(s) containing the NB-PBCH transmissions.

Alternatively, the 'm' values to be used for the PRBs without NB-PBCH transmissions may be configured using explicit or implicit signaling.

It should be appreciated that techniques described with respect to implementation B may be applied to implementation A, including but not limited to, transmission of the NB-RS on symbols next to the legacy CRS, and application of the same frequency shift for NB-RS as used for legacy CRS.

Figure 5:
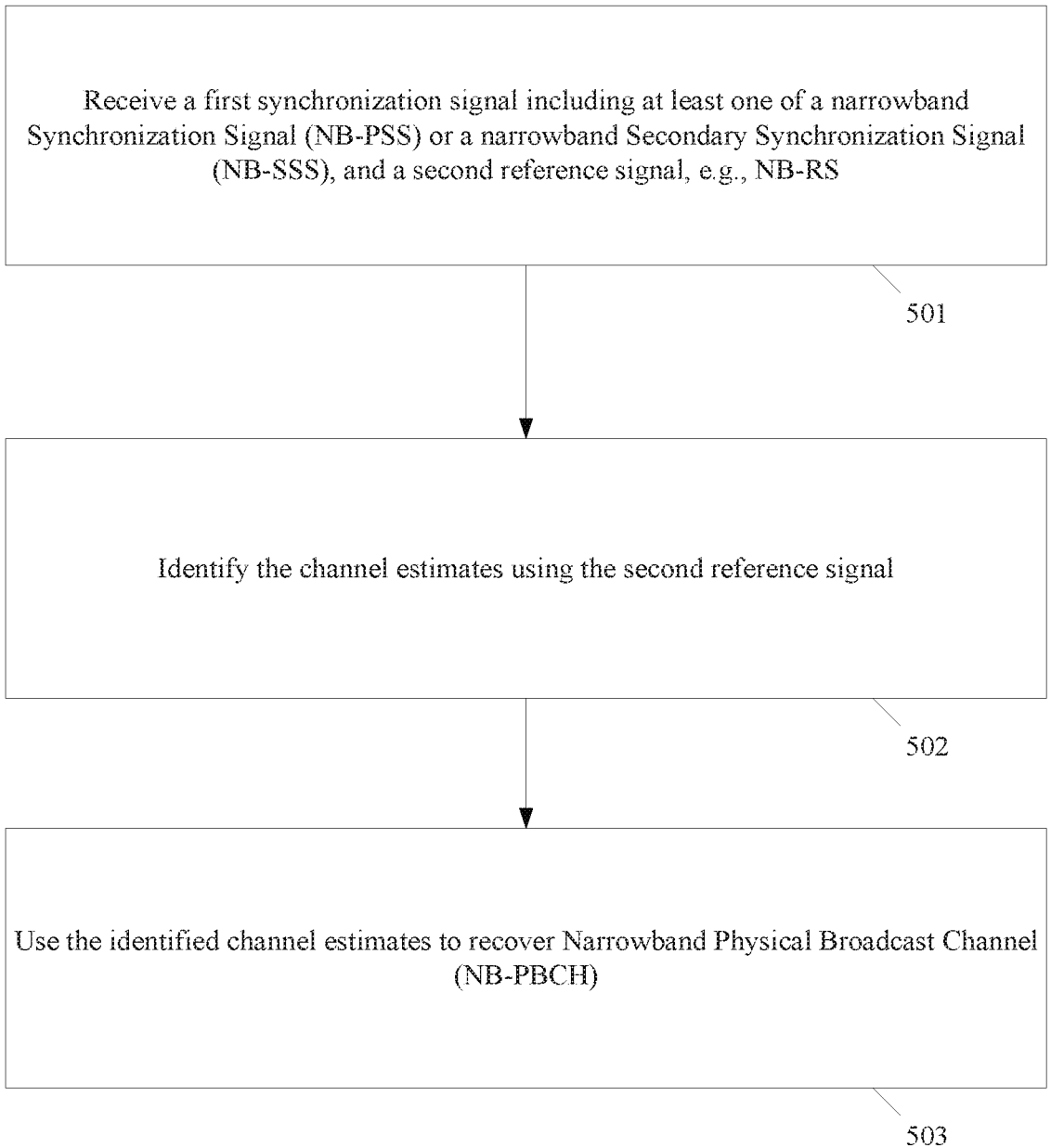
FIG. 5 illustrates operations that may performed by the circuitry of the CIoT device of FIG. 4 in accordance with various embodiments.

FIG. 5 illustrates operations that may performed by the circuitry 415 of the CIoT device of FIG. 4 in accordance with various embodiments.

The operations described in FIG. 5 may be performed by the UE 404 in accordance with some embodiments. The operations described in the flowchart may be performed by various components of the UE 404 such as, but not limited to, communication circuitry or control circuitry of the circuitry 415.

In block 501, the circuitry 415 may receive a first synchronization signal including at least one of NB-PSS or NB-SSS, and a second reference signal, e.g., NB-RS (e.g., different than LTE CRS). In an example, the UE may acquire time and frequency synchronization with an eNB based on at least one of NB-PSS or NB-SSS that are transmitted by the eNB.

In block 502, the circuitry 415 may identify the channel estimates using the second reference signal. In an example, the UE may use frame timing to determine physical resources and time locations, e.g., subframes carrying NB-PBCH that are cell-specific.

In block 503, the circuitry 415 may use the identified channel estimates to recover NB-PBCH. In an example, the UE may demodulate NB-PBCH using the identified channel estimates.

Figure 6:
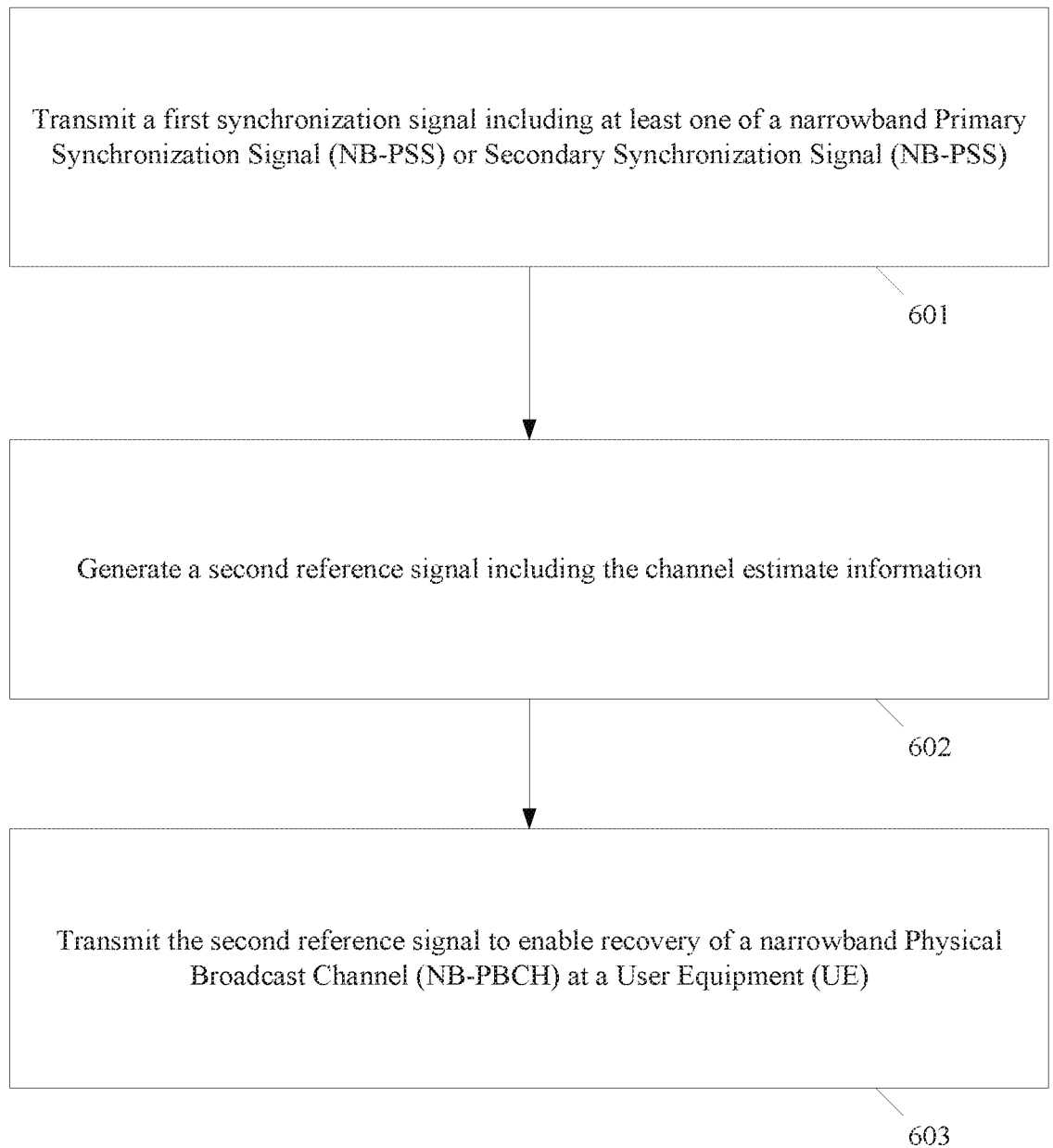
FIG. 6 illustrates operations that may performed by the circuitry of the eNB of FIG. 4 in accordance with various embodiments.

FIG. 6 illustrates operations that may performed by the circuitry of the eNB of FIG. 4 in accordance with various embodiments.

The operations described in FIG. 5 may be performed by the eNB 408 in accordance with some embodiments. The operations described in the flowchart may be performed by various components of the eNB 408 such as, but not limited to, communication circuitry or control circuitry of the circuitry 427.

In block 601, the circuitry 427 may transmit a first synchronization signal including at least one of NB-PSS or NB-PSS. In block 602, the circuitry 427 may generate a second reference signal including the channel estimate information. In block 603, the circuitry 427 may transmit the second reference signal to enable recovery of NB-PBCH at the UE.

Figure 10:
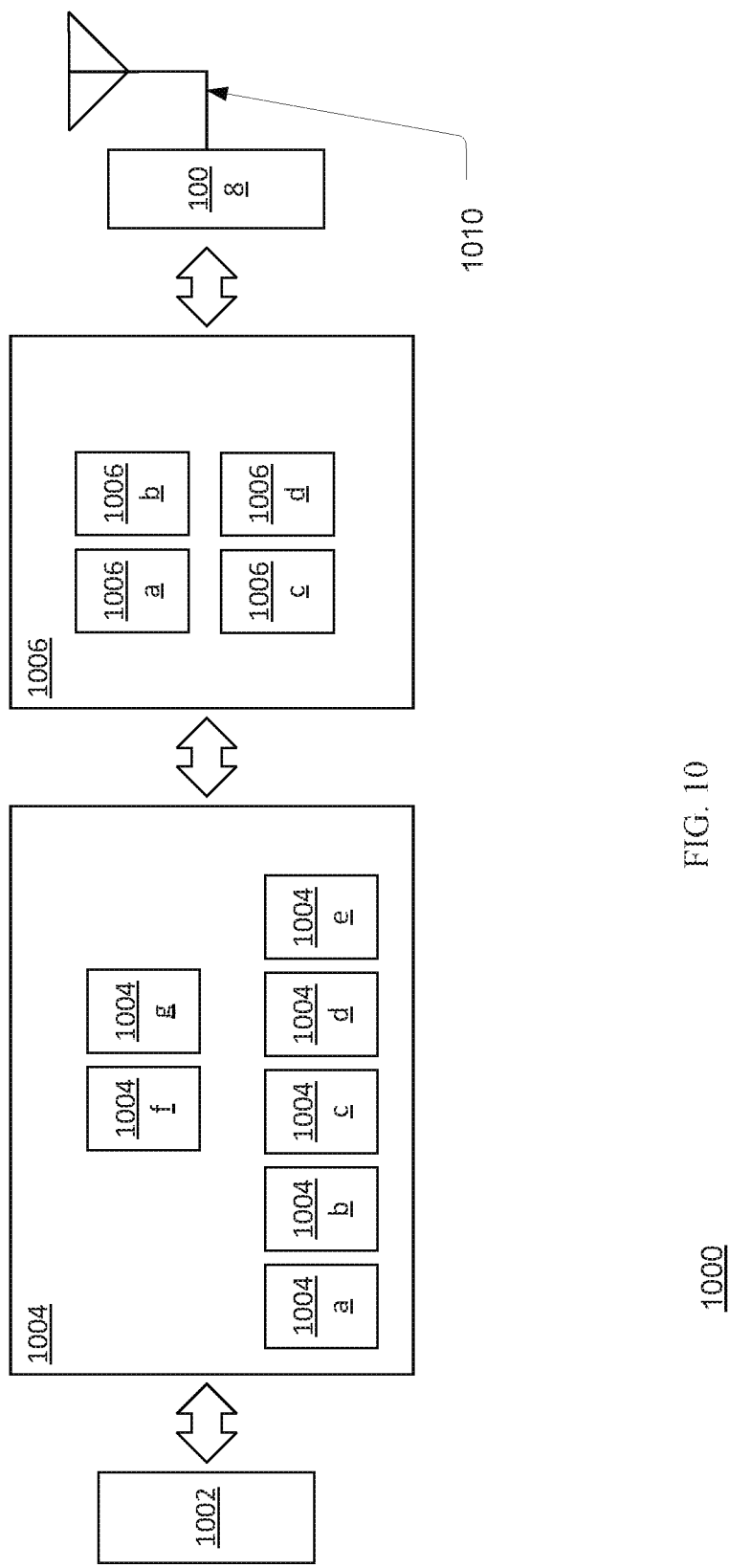
FIG. 10 illustrates electronic devices that may be utilized in accordance with various embodiments.

FIG. 10 illustrates electronic devices that may be utilized in accordance with various embodiments.

Embodiments described herein may be implemented into a system using any suitably configured hardware and/or software. FIG. 10 illustrates, for one embodiment, example components of an electronic device 1000. In embodiments, the electronic device 1000 may be, implement, be incorporated into, or otherwise be a part of a user equipment (UE) (such as the UEs of FIGS. 1 and 4), an evolved NodeB (eNB) (such as the eNBs of FIGS. 1 and 4), or some other electronic device. In some embodiments, the electronic device 1000 may include application circuitry 1002, baseband circuitry 1004 (which may correspond, for example, to the circuitry 115, 127, 415, and 427 of FIGS. 1 and 4), radio frequency (RF) circuitry 1006 (which may, for example, correspond to the RF transceivers of FIGS. 1 and 4), front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments.

The baseband circuitry 1004 may further include memory/storage 1004g. The memory/storage 1004g may be used to load and store data and/or instructions for operations performed by the processors of the baseband circuitry 1004. Memory/storage for one embodiment may include any combination of suitable volatile memory and/or non-volatile memory. The memory/storage 1004g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1004g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry

1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the electronic device 1000 may include additional elements such as, for example, memory/storage, display, camera, sensor, and/or input/output (I/O) interface.

In some embodiments, the electronic device 1000 may be configured to perform one or more processes, techniques, and/or methods as described herein, or portions thereof. Some non-limiting examples are provided below.

Example 1 may include a system and method of Narrowband Physical Broadcast Channel (NB-PBCH) reception at the UE wherein the NB-PBCH is demodulated using channel estimates obtained from the NB-PSS or NB-SSS that are transmitted on subframe adjacent to the subframe carrying NB-PBCH and wherein the NB-PSS subframe location within a set of consecutive LTE subframes is cell-specific.

Example 2 may include the UE of example 1 or some other example herein, wherein the N consecutive LTE subframes correspond to the ten subframes of an LTE radio frame spanning a duration of 10 ms.

Example 3 may include the UE of example 1 or some other example herein, wherein the NB-PSS location within the LTE frame is defined as a function of the Physical Cell Identity (PCID) of the transmitting cell.

Example 4 may include the UE of example 3 or some other example herein, wherein the subframe location for NB-PSS is given by Subframe (SF) #n where n=mod(3*mod (PCID, 3)+9, 10) for the case wherein any downlink (DL) subframe may be used for transmission of NB-PSS and NB-PBCH.

Example 5 may include the UE of example 3 or some other example herein, wherein the subframe location for NB-PSS is given by SF #n where n=n_cand(i) where i=mod (PCID, 2) and n_cand={4, 9} and wherein NB-PBCH adjacent to NB-PSS is transmitted on either SF #5 of the same radio frame or SF#0 of the next radio frame.

Example 6 may include the UE of example 3 or some other example herein, wherein the subframe location for NB-PSS is given by Subframe (SF) #n where n=mod(3*mod (PCID, 3)+9, 10) for the case wherein any downlink (DL) subframe may be used for transmission of NB-PSS and NB-PBCH for stand-alone NB-LTE deployments, and is given by SF #n where n=n_cand(i) where i=mod(PCID, 2) and n_cand={4, 9} and wherein NB-PBCH adjacent to NB-PSS is transmitted on either SF #5 of the same radio frame or SF#0 of the next radio frame for in-band deployments of NB-LTE.

Example 7 may include the UE of example 1 or some other example herein, wherein the same NB-PSS location is maintained for all repetitions of the NB-PSS transmissions.

Example 8 may include a system and method of Narrowband Physical Broadcast Channel (NB-PBCH) reception at the UE wherein the NB-PBCH is demodulated using channel estimates obtained from new reference signals (NB-RS) that are different from LTE CRS, NB-PSS or NB-SSS.

Example 9 may include the UE of example 8 or some other example herein, wherein the NB-RS is present at least in subframes carrying NB-PBCH on or different from the OFDM symbols carrying legacy CRS.

Example 10 may include the UE of example 8 or some other example herein, wherein the NB-PBCH data REs may be mapped to symbols within the subframe that avoid the first three or four OFDM symbols (corresponding to legacy LTE DL control channels like PDCCH, PCFICH, and PHICH), and LTE CRS REs.

Example 11 may include the UE of example 9 or some other example herein, wherein the NB-PBCH is transmitted in the OFDM symbols with LTE CRS.

Example 12 may include the UE of example 11 or some other example herein, wherein within the CRS symbols other than the first three OFDM symbols in an LTE subframe, the NB-RS are mapped onto one or more REs not occupying the CRS.

Example 13 may include the UE of example 11 or some other example herein, wherein the NB-RS use the resource and antenna port (AP) mapping similar to CRS design for one, two, or four AP transmissions and the sequence used for NB-RS uses the CRS sequence corresponding to that for PRB index 0 for LTE CRS.

Example 14 may include the UE of example 11 or some other example herein, wherein the mapping of REs for NB-RS to APs is same as LTE CRS or swapped between APs 0 and 1, and between APs 2 and 3 in frequency dimension and between APs 0 and 2, and between APs 1 and 3 in time dimension, and equal number of REs allocated for each AP as shown in FIG. 1.

Example 15 may include the UE of example 11 or some other example herein, wherein the NB-RS is mapped to subcarriers k within a PRB similar to CRS with an additional shift of 1 or 2 subcarriers, e.g., $$k=6m+(v+v_{shift}+x)\bmod 6$$

where m=0 and 1, x=1 or 2, and v defined as in legacy LTE specifications.

Example 16 may include the UE of example 11 or some other example herein, wherein the NB-PBCH data symbols are rate-matched around or punctured by both legacy CRS REs and NB-CRS REs.

Example 17 may include the UE of example 11 or some other example herein, wherein NB-PBCH is transmitted using two additional OFDM symbols compared to the case of extended Cyclic Prefix (extended CP) in the last two OFDM symbols in a subframe for the case of normal CP.

Example 18 may include the UE of example 9 or some other example herein, wherein the NB-PBCH is not transmitted in the OFDM symbols with LTE CRS.

Example 19 may include the UE of example 18 or some other example herein, wherein the NB-RS is transmitted as described in Examples 12 through 15.

Example 20 may include the UE of example 18 or some other example herein, wherein the NB-RS are transmitted in symbols next to the LTE CRS symbols.

Example 21 may include the UE of example 18 or some other example herein, wherein the NB-RS are transmitted with the same frequency shift for the transmission of LTE CRS as determined by the PCID.

Example 22 may include the UE of example 18 or some other example herein, wherein the NB-RS are transmitted using antenna port (AP) to RE mapping as shown in FIG. 2 or 3.

Example 23 may include the UE of example 9 or some other example herein, wherein the NB-RS are transmitted with application of power boosting independent of the LTE CRS.

Example 24 may include the UE of example 9 or some other example herein, wherein the NB-RS are mapped to subcarriers using m=0 or m=1 but not both values of m within a PRB in the equation below:

$$k=6m+(v+v_{shift}+x)\bmod 6$$

with x=0, 1, or 2

Example 25 may include the UE of example 9 or some other example herein, wherein the NB-RS APs are limited to APs 0 and 1 only to support up to 2 antenna port (AP) transmission of NB-PBCH.

Example 26 may include the UE of example 25 or some other example herein, wherein the NB-RS REs mapped to APs 2 and 3 are re-used for APs 0 and 1 respectively or are used to map NB-PBCH data REs.

Example 27 may include the UE of example 9 or some other example herein, wherein the NB-RS is used for used for purposes in addition to demodulation of NB-PBCH, that may include Radio Resource Management (RRM) measurements including RSRP/RSRQ measurements.

Example 28 may include the UE of example 27 or some other example herein, wherein if multiple PRBs are available for the NB-LTE system, the NB-RS sequence and frequency domain subcarrier locations within a PRB for NB-RS are mapped similar to LTE CRS using values of 'm' in the equation $$k=6m+(v+v_{shift}+x) \bmod 6$$

with x=0, 1, or 2, that are either indexed over the set of available PRBs, starting with m=0 for the one or multiple PRBs containing the NB-PBCH transmissions or are indicated to the UE using explicit or implicit signaling means.

Example 29 may include an apparatus comprising means to perform one or more elements of a method described in or related to any of examples 1-28, or any other method or process described herein.

Example 30 may include one or more non-transitory computer-readable media comprising instructions to cause an electronic device, upon execution of the instructions by one or more processors of the electronic device, to perform one or more elements of a method described in or related to any of examples 1-28, or any other method or process described herein.

Example 31 may include an apparatus comprising logic, modules, and/or circuitry to perform one or more elements of a method described in or related to any of examples 1-28, or any other method or process described herein.

Example 32 may include a method, technique, or process as described in or related to any of examples 1-28, or portions or parts thereof.

Example 33 may include a method of communicating in a wireless network as shown and described herein.

Example 34 may include a system for providing wireless communication as shown and described herein.

Example 35 may include a device for providing wireless communication as shown and described herein.

ADDITIONAL NOTES AND EXAMPLES

Examples may include subject matter such as a method, means for performing acts of the method, at least one machine-readable medium including instructions that, when performed by a machine cause the machine to performs acts of the method, or of an apparatus or system for utilizing media streaming through section change detection markers according to embodiments and examples described herein.

Example 1 is an apparatus of a User Equipment (UE) to identify channel estimates of a synchronization signal including at least one of a Narrowband Primary or Secondary Synchronization Signal (NB-PSS or NB-SSS) to recover a Narrowband Physical Broadcast Channel (NB-PBCH) is provided. The apparatus may include radio frequency (RF) circuitry to receive the synchronization signal including at least one of the NB-PSS or NB-SSS; and baseband circuitry to identify the channel estimates corresponding to a first subframe of the synchronization signal adjacent to a second subframe carrying the NB-PBCH, wherein a location of the first subframe within a set of consecutive subframes is cell-specific. The baseband circuitry may be to use the identified channel estimates to recover the NB-PBCH.

Example 2 includes the subject matter of example 1, and the set of consecutive subframes corresponds to ten subframes of a Long-Term Evolution (LTE) radio frame spanning a duration of 10 milliseconds (ms).

Example 3 includes the subject matter of examples 1 or 2, and the location of the first subframe is defined as a function of a Physical Cell Identity (PCID) of a transmitting cell.

Example 4 includes the subject matter of example 3, and the first subframe includes an NB-PSS, the first subframe having an index n, where n=mod(3*mod(PCID, 3)+9, 10), wherein any downlink (DL) subframe can be used for transmission of NB-PSS and NB-PBCH.

Example 5 includes the subject matter of example 3, and the first subframe includes an NB-PSS, the first subframe having an index n, where n=n_cand(i) where i=mod(PCID, 2) and n_cand={4, 9}, and wherein the NB-PBCH is adjacent to the NB-PSS and transmitted in the second subframe, the second subframe having an index 5 and is in a first radio frame of the first subframe or has an index 0 and is in a second radio frame that follows the first radio frame.

Example 6 includes the subject matter of example 3, and the apparatus is to communicate using a stand-alone narrowband Long-Term Evolution (NB-LTE) deployment, the synchronization signal includes an NB-PSS in a third subframe having an index n, where n=mod(3*mod(PCID, 3)+9, 10), wherein any downlink (DL) subframe can be used for transmission of NB-PSS and NB-PBCH.

Example 7 includes the subject matter of example 3, and the apparatus is to communicate using an in-band narrowband Long-Term Evolution (NB-LTE) deployment, the synchronization signal includes an NB-PSS in a third subframe of a first radio frame, the third subframe having an index n, where n=n_cand(i) where i=mod(PCID, 2) and n_cand={4, 9}, and wherein the NB-PBCH is adjacent to the NB-PSS and is transmitted in a fourth subframe that has an index 5 and is in the first radio frame or has an index 0 and is in a second radio frame that follows the first radio frame.

Example 8 includes the subject matter of any of examples 1-7, wherein the synchronization signal includes an NB-PSS and a relative position of the NB-PSS within the set of consecutive subframes with respect to an initial subframe of the set is maintained for all repetitions of the NB-PSS transmissions.

Example 9 is an apparatus of a User Equipment (UE) to identify channel estimates to recover a Narrowband Physical Broadcast Channel (NB-PBCH). The apparatus may include radio frequency (RF) circuitry to receive a first synchronization signal including at least one of a narrowband Synchronization Signal (NB-PSS) or a narrowband Secondary Synchronization Signal (NB-SSS), to receive a second reference signal that is different than an LTE (long term evolution) Cell-specific Reference Signal (CRS); and baseband circuitry to identify the channel estimates using the second reference signal. The second reference signal may be different than the first synchronization signal. The baseband circuitry may be to demodulate the NB-PBCH based on the identified channel estimates.

Example 10 may include the subject matter of example 9, wherein the second reference signal is present in subframes carrying the NB-PBCH, and wherein data symbols of the NB-PBCH are rate-matched around, or punctured by, at least one of LTE CRS resource elements or the second reference signal.

Example 11 may include the subject matter of example 10, wherein data resource elements carrying symbols of the NB-PBCH are mapped to Orthogonal Frequency-Division Multiplexing (OFDM) symbols carrying the LTE CRS resource elements.

Example 12 may include the subject matter of example 11, where within a group of the OFDM symbols carrying the LTE CRS resource elements the second reference signal is mapped onto at least one resource element not occupying the LTE CRS, wherein said group of OFDM signals does not include an initial three symbols in a downlink subframe.

Example 13 may include the subject matter of example 11, wherein the second reference signal is transmitted in at least one symbol next to symbols of the LTE CRS.

Example 14 may include the subject matter of example 13, wherein the second reference signal corresponds to a same frequency shift of the LTE CRS as a function of a Physical Cell Identity (PCID) of a transmitting cell.

Example 15 may include the subject matter of examples 10-14, wherein the second reference signal corresponds to application power boosting that is independent of the LTE CRS.

Example 16 may include the subject matter of examples 10-15, wherein the NB-PBCH is not transmitted in OFDM symbols of the LTE CRS.

Example 17 may include the subject matter of examples 10-16, wherein the second reference signal is limited to a maximum of two antenna ports, and corresponds to only antenna ports (AP) 0 and 1.

Example 18 may include the subject matter of example 17, wherein resource elements of the second reference signal corresponding to APs 2 and 3 are re-used for the APs 0 and 1, respectively, or are used to map symbols of the NB-PBCH.

Example 19 is an apparatus of an eNB (evolved Node B) to provide channel estimates usable to recover a narrowband Physical Broadcast Channel (NB-PBCH) at a User Equipment (UE). The apparatus may include radio frequency (RF) circuitry to transmit a first synchronization signal including at least one of a narrowband Primary Synchronization Signal (NB-PSS) or Secondary Synchronization Signal (NB-PSS); and baseband circuitry to generate a second reference signal including the channel estimate information, the second reference signal different than an LTE (long term evolution) Cell-specific Reference Signal (CRS). The second reference signal may be different than the first synchronization signal. The RF circuitry may be to transmit the second reference signal.

Example 20 may include the subject matter of example 19, wherein the baseband circuitry is to insert the second reference signal in subframes carrying the NB-PBCH.

Example 21 may include the subject matter of example 20, wherein the baseband circuitry is to transmit the second reference signal using an application of power boosting level that is independent of an application power boosting level that is used to transmit the LTE CRS.

Example 22 may include the subject matter of example 20, wherein the baseband circuitry is to transmit the NB-PBCH in Orthogonal Frequency-Division Multiplexing (OFDM) symbols carrying the LTE CRS, and wherein data symbols of the NB-PBCH are rate-matched around, or punctured by, at least one of LTE CRS resource elements or the second reference signal.

Example 23 may include the subject matter of example 22, wherein the baseband circuitry is to transmit the second reference signal in at least one symbol next to symbols of the LTE CRS.

Example 24 is a method of identifying channel estimates of a synchronization signal including at least one of a Narrowband Primary or Secondary Synchronization Signal (NB-PSS or NB-SSS) to recover a Narrowband Physical Broadcast Channel (NB-PBCH). The method may include identifying the channel estimates corresponding to a first subframe of the synchronization signal adjacent to a second subframe carrying the NB-PBCH, wherein a location of the first subframe within a set of consecutive subframes is cell-specific; and using the identified channel estimates to recover the NB-PBCH.

Example 25 may include the subject matter of example 24, wherein the set of consecutive subframes corresponds to ten subframes of a Long-Term Evolution (LTE) radio frame spanning a duration of 10 milliseconds (ms).

Example 26 is a method of operating a User Equipment (UE) in a wireless network. In an example, the method includes receiving a synchronization signal including at least one of a Narrowband Primary or Secondary Synchronization Signal (NB-PSS or NB-SSS); identifying channel estimates corresponding to a first subframe of the synchronization signal adjacent to a second subframe carrying Narrowband Physical Broadcast Channel (NB-PBCH), wherein a location of the first subframe within a set of consecutive subframes is cell-specific; and using the identified channel estimates to recover the NB-PBCH.

Example 27 may include the subject matter of example 26, wherein the set of consecutive subframes corresponds to ten subframes of a Long-Term Evolution (LTE) radio frame spanning a duration of 10 milliseconds (ms).

Example 28 may include the subject matter of example 26 or 27, wherein the location of the first subframe is defined as a function of a Physical Cell Identity (PCID) of a transmitting cell.

Example 29 may include the subject matter of example 28, where the first subframe includes an NB-PSS, the first subframe having an index n, where n=mod(3*mod(PCID, 3)+9, 10), wherein any downlink (DL) subframe can be used for transmission of NB-PSS and NB-PBCH.

Example 30 may include the subject matter of example 28, where the first subframe includes an NB-PSS, the first subframe having an index n, where n=n_cand(i) where i=mod(PCID, 2) and n_cand={4, 9}, and wherein the NB-PBCH is adjacent to the NB-PSS and transmitted in the second subframe, the second subframe having an index 5 and is in a first radio frame of the first subframe or has an index 0 and is in a second radio frame that follows the first radio frame.

Example 31 may include the subject matter of example 28, wherein the UE is to communicate using a stand-alone narrowband Long-Term Evolution (NB-LTE) deployment, the synchronization signal includes an NB-PSS in a third subframe having an index n, where n=mod(3*mod(PCID, 3)+9, 10), wherein any downlink (DL) subframe can be used for transmission of NB-PSS and NB-PBCH.

Example 32 may include the subject matter of example 28, wherein the UE is to communicate using an in-band narrowband Long-Term Evolution (NB-LTE) deployment, the synchronization signal includes an NB-PSS in a third subframe of a first radio frame, the third subframe having an index n, where n=n_cand(i) where i=mod(PCID, 2) and n_cand={4, 9}, and wherein the NB-PBCH is adjacent to the NB-PSS and is transmitted in a fourth subframe that has an index 5 and is in the first radio frame or has an index 0 and is in a second radio frame that follows the first radio frame.

Example 33 may include the subject matter of any of examples 25-32, wherein the synchronization signal includes an NB-PSS and a relative position of the NB-PSS within the set of consecutive subframes with respect to an initial subframe of the set is maintained for all repetitions of the NB-PSS transmissions.

Example 34 may include a method of operating a User Equipment (UE) for communicating in a wireless network. The method may include receiving a first synchronization signal including at least one of a narrowband Synchronization Signal (NB-PSS) or a narrowband Secondary Synchronization Signal (NB-SSS), to receive a second reference signal including channel estimate information, the second reference signal different than an LTE (long term evolution) Cell-specific Reference Signal (CRS); wherein the second reference signal is different than the first synchronization signal; identifying channel estimates using the second reference signal; and demodulating a Narrowband Physical Broadcast Channel (NB-PBCH) based on the identified channel estimates.

Example 35 may include the subject matter of example 34, wherein the second reference signal is present in subframes carrying the NB-PBCH, and wherein data symbols of the NB-PBCH are rate-matched around, or punctured by, at least one of LTE CRS resource elements or the second reference signal.

Example 36 may include the subject matter of example 35, wherein data resource elements carrying symbols of the NB-PBCH are mapped to Orthogonal Frequency-Division Multiplexing (OFDM) symbols carrying the LTE CRS resource elements.

Example 37 may include the subject matter of example 36, wherein within a group of the OFDM symbols carrying the LTE CRS resource elements the second reference signal is mapped onto at least one resource element not occupying the LTE CRS, wherein said group of OFDM signals does not include an initial three symbols in a downlink subframe.

Example 38 may include the subject matter of example 36, wherein the second reference signal is transmitted in at least one symbol next to symbols of the LTE CRS.

Example 39 may include the subject matter of example 38, wherein the second reference signal corresponds to a same frequency shift of the LTE CRS as a function of a Physical Cell Identity (PCID) of a transmitting cell.

Example 40 may include the subject matter of any of examples 34-38, wherein the second reference signal corresponds to application power boosting that is independent of the LTE CRS.

Example 41 may include the subject matter of any of examples 34-38, wherein the NB-PBCH is not transmitted in OFDM symbols of the LTE CRS.

Example 42 may include the subject matter of any of examples 34-38, wherein the second reference signal is limited to a maximum of two antenna ports, and corresponds to only antenna ports (AP) 0 and 1.

Example 43 may include the subject matter of example 42, wherein resource elements of the second reference signal corresponding to APs 2 and 3 are re-used for the APs 0 and 1, respectively, or are used to map symbols of the NB-PBCH.

Example 44 is method for operating an eNB (evolved Node B). The method may include transmitting a first synchronization signal including at least one of a narrowband Primary Synchronization Signal (NB-PSS) or Secondary Synchronization Signal (NB-PSS); generating a second reference signal including channel estimate information, the second reference signal different than an LTE (long term evolution) Cell-specific Reference Signal (CRS). The second reference signal may be different than the first synchronization signal. The method may include transmitting the second reference signal.

Example 45 may include the subject matter of example 44, wherein the baseband circuitry is to insert the second reference signal in subframes carrying a narrowband Physical Broadcast Channel (NB-PBCH).

Example 46 may include the subject matter of example 45, wherein the baseband circuitry is to transmit the second reference signal using an application of power boosting level that is independent of an application power boosting level that is used to transmit the LTE CRS.

Example 47 may include the subject matter of example 45, wherein the baseband circuitry is to transmit the NB-PBCH in Orthogonal Frequency-Division Multiplexing (OFDM) symbols carrying the LTE CRS, and wherein data symbols of the NB-PBCH are rate-matched around, or punctured by, at least one of LTE CRS resource elements or the second reference signal.

Example 48 may include the subject matter of example 47, wherein the baseband circuitry is to transmit the second reference signal in at least one symbol next to symbols of the LTE CRS.

Example 49 is one or more computer-readable media having instructions that, when executed, cause a device to perform any one of the methods of examples 26-48.

Example 50 is an apparatus having means configured to perform any one of the methods of examples 26-48.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus, comprising:
radio frequency (RF) circuitry to receive a synchronization signal including at least one of a Narrowband Primary or Secondary Synchronization Signal (NB-PSS or NB-SSS);
baseband circuitry to identify channel estimates corresponding to a first subframe of the synchronization signal adjacent to a second subframe carrying Narrowband Physical Broadcast Channel (NB-PBCH), wherein a location of the first subframe within a set of ten consecutive subframes of a Long-Term Evolution (LTE) radio frame is cell-specific based on a Physical Cell Identity (PCID) of a transmitting cell and the set of ten consecutive subframes of the LTE radio frame spans a duration of 10 milliseconds (ms); and
the baseband circuitry to use the identified channel estimates to recover the NB-PBCH.

2. The apparatus of claim of 1, wherein the location of the first subframe is defined as a function of the PCID of the transmitting cell.

3. The apparatus of claim 2, where the first subframe includes an NB-PSS, the first subframe having an index n, where n=mod(3*mod(PCID, 3)+9, 10), wherein any downlink (DL) subframe can be used for transmission of NB-PSS and NB-PBCH.

4. The apparatus of claim 2, where the first subframe includes an NB-PSS, the first subframe having an index n, where n=n_cand(i) where i=mod(PCID, 2) and n_cand={4, 9}, and wherein the NB-PBCH is adjacent to the NB-PSS and transmitted in the second subframe, the second subframe having an index 5 and is in a first radio frame of the first subframe or has an index 0 and is in a second radio frame that follows the first radio frame.

5. The apparatus of claim 2, wherein the apparatus is to communicate using a stand-alone narrowband Long-Term Evolution (NB-LTE) deployment, the synchronization signal includes an NB-PSS in a third subframe having an index n, where n=mod(3*mod(PCID, 3)+9, 10), wherein any downlink (DL) subframe can be used for transmission of NB-PSS and NB-PBCH.

6. The apparatus of claim 2, wherein the apparatus is to communicate using an in-band narrowband Long-Term Evolution (NB-LTE) deployment, the synchronization signal includes an NB-PSS in a third subframe of a first radio frame, the third subframe having an index n, where n=n_cand(i) where i=mod(PCID, 2) and n_cand={4, 9}, and wherein the NB-PBCH is adjacent to the NB-PSS and is transmitted in a fourth subframe that has an index 5 and is in the first radio frame or has an index 0 and is in a second radio frame that follows the first radio frame.

7. The apparatus of claim 1, wherein the synchronization signal includes an NB-PSS, and a relative position of the NB-PSS within the set of ten consecutive subframes with respect to an initial subframe of the set is maintained for all repetitions of the NB-PSS transmissions.

8. One or more non-transitory computer-readable media having instructions stored thereon that, in response to execution by one or more processors of a User Equipment (UE), cause the UE to perform operations, to:

in response to receipt of a synchronization signal including at least one of a Narrowband Primary or Secondary Synchronization Signal (NB-PSS or NB-SSS), identify channel estimates corresponding to a first subframe of the synchronization signal adjacent to a second subframe carrying Narrowband Physical Broadcast Channel (NB-PBCH), wherein a location of the first subframe within a set of ten consecutive subframes of a Long-Term Evolution (LTE) radio frame is cell-specific based on a Physical Cell Identity (PCID) of a transmitting cell and the set of ten consecutive subframes spans a duration of 10 milliseconds (ms); and use the identified channel estimates to recover the NB-PBCH.

9. The non-transitory computer-readable media of claim 8, wherein the location of the first subframe is defined as a function of the PCID of the transmitting cell.

10. The non-transitory computer-readable media of claim 9, wherein the location of the first subframe is indicated by an index n, where n=mod(3*mod(PCID, 3)+9, 10).

11. The non-transitory computer-readable media of claim 9, wherein the location of the first subframe is indicated by an index n, where n=n_cand(i) where i=mod(PCID, 2) and n_cand={4, 9}.

12. The non-transitory computer-readable media of claim 11, wherein the NB-PBCH is adjacent to the NB-PSS and transmitted in the second subframe, the second subframe having an index 5 and is in a first radio frame of the first subframe or has an index 0 and is in a second radio frame that follows the first radio frame.

13. The non-transitory computer-readable media of claim 9, wherein the synchronization signal includes an NB-PSS in a third subframe of a first radio frame, the third subframe having an index n, where n=n_cand(i) where i=mod(PCID, 2) and n_cand={4, 9}, and wherein the NB-PBCH is adjacent to the NB-PSS and is transmitted in a fourth subframe that has an index 5 and is in the first radio frame or has an index 0 and is in a second radio frame that follows the first radio frame.

* * * * *